United States Patent
Combs

[11] 4,053,293
[45] Oct. 11, 1977

[54] COMBINATION DUST COLLECTOR AND HEAT EXCHANGER

[75] Inventor: Donald R. Combs, Seattle, Wash.

[73] Assignee: Bumstead Woolford Co., Woodinville, Wash.

[21] Appl. No.: 635,790

[22] Filed: Nov. 28, 1975

[51] Int. Cl.² .......................................... B01D 51/00
[52] U.S. Cl. ..................................... 55/269; 55/222;
    55/319; 55/392; 110/56; 165/138; 122/421
[58] Field of Search ................... 55/80, 269, 319, 339,
    55/392, 418, 424, 426, 459 B, 84, 222, 260,
    442–446; 110/56; 165/138; 122/421

[56] References Cited
U.S. PATENT DOCUMENTS

| | | | |
|---|---|---|---|
| 559,757 | 5/1896 | Smith | 122/421 |
| 597,727 | 1/1898 | Maloney | 122/421 |
| 1,235,928 | 8/1917 | Sargent et al. | 122/421 |
| 1,314,140 | 8/1919 | Jacobus | 122/421 |
| 1,660,788 | 2/1928 | Foresman | 110/56 |
| 1,720,536 | 7/1929 | Young | 55/269 |
| 1,795,909 | 3/1931 | Brunt et al. | 55/269 |
| 2,236,358 | 3/1941 | Allardice | 55/269 |
| 2,265,091 | 12/1941 | Van Tongeren | 55/442 |
| 2,448,424 | 8/1948 | Dohrmann | 55/442 |
| 2,569,710 | 10/1951 | Fitzpatrick | 55/269 |
| 3,704,570 | 12/1972 | Gardenier | 55/84 |

*Primary Examiner*—Frank W. Lutter
*Assistant Examiner*—David L. Lacey
*Attorney, Agent, or Firm*—Dowrey & Cross

[57] ABSTRACT

A dust collector of the gravity separation type is combined with a heat exchanger to provide a dust collector/air preheater, or a dust collector/economizer, depending upon the heat exchange fluid used, suited for usage in a system or process for discharging and exchanging heat with exhaust gases from a boiler.

4 Claims, 7 Drawing Figures

COMBINATION DUST COLLECTOR AND HEAT EXCHANGER

BACKGROUND OF THE INVENTION

This invention relates to a combination dust collector and heat exchanger.

Many boiler installations employ gravity separation dust collectors for removing entrained solid combustion products (hereinafter referred to as dust) from the boiler exhaust or flue gases prior to discharge to atmosphere. Gravity separation dust collectors are highly economical in such installations because they possess high cleaning efficiency with low draft loss — thus making them adaptable to natural and forced draft systems — and require little or no maintenance or cleaning.

Until recently, the operators of boiler installations of this type did not attempt to improve the overall thermal efficiency of the installation by extracting and reclaiming a portion of the available waste heat from the boiler exhaust gases because cheap fuel, such as wood, was in plentiful supply. Consequently, heat exchange apparatus such as economizers and air preheaters heretofore have been employed almost exclusively in large power plants, or in combination with cyclone, centrifugal or deflection dust collectors of the type disclosed in U.S. Pat. Nos. 1,795,909, 1,875,341, 2,060,169, 2,327,691, 2,437,294, 2,569,710 and 2,761,526. With sky-rocketing fuel prices, coupled with a decline in supplies of cheap fuel, however, the operators of such boiler installations are now searching for a method and apparatus for increasing thermal efficiency economically. One approach would be to install separate small-scale air preheaters or economizers generally similar to those previously used with large power plants; however, the capital investment involved in acquiring and installing these units typically is not warranted by the savings achieved by increased thermal efficiency because of the relatively small scale of the above-mentioned type of boiler installations.

SUMMARY OF THE INVENTION

This invention combines a dust collector of the gravity separation type with a heat exchanger. According to one preferred embodiment of the invention, the heat exchanger includes a plurality of spaced apart heat exchange elements in the form of thermally conductive tubes, through which a heat exchange fluid is passed. The heat exchange elements are positioned in the dust collector for contact with gases passing therethrough, preferably for contact with gases entering and exiting the gravity separation chamber, to effect heat exchange between the gases and the heat exchange fluid. It will be understood, of course, that the term "fluid" as used herein refers to air, water or other appropriate heat exchange media.

Thus, it will be appreciated from the foregoing summary that this invention now provides a method and apparatus for reclaiming waste heat on an economical basis by utilizing existing or proposed gravity separation type dust collectors to clean exhaust gases in combination with heat exchange means for extracting heat therefrom. The heat exchange means, of course, may serve as an economizer, or as an air preheater, depending upon the type of boiler installation and choice of heat exchange fluid. In addition to conserving waste heat, this invention also produces a reduction in temperature of the boiler exhaust gases actually present within the dust collector, thus lengthening the operating life of the dust collector as well as increasing the effectiveness of the gravity separation process. The principles of this invention are further applicable to a system or method for discharging and exchanging heat with exhaust gases from a boiler or like source of exhaust gases.

These and other features, objects and advantages of the present invention will become apparent from the detailed description to follow taken in conjunction with the accompanying drawings in which:

DETAILED DESCRIPTION OF THE DRAWINGS

Figure 1:
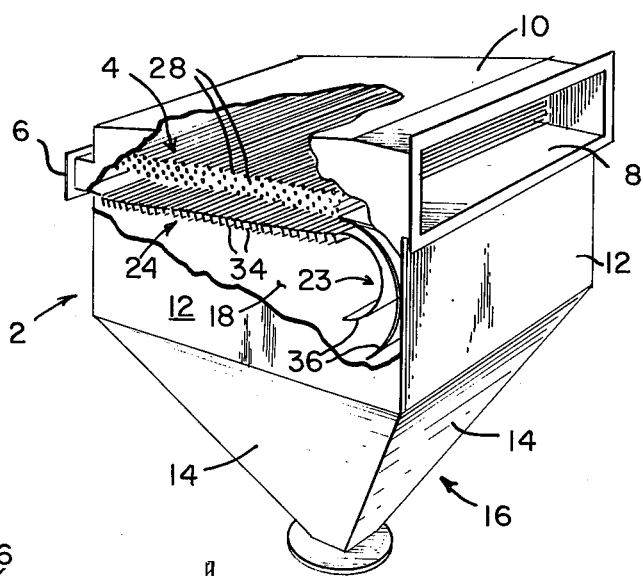
FIG. 1 is a perspective with parts broken away of the combination dust collector and heat exchanger of the present invention adapted for use as an air preheater.

The combination dust collector and heat exchanger of this invention includes a gravity separation dust collector generally designated 2 in FIG. 1 in combination with heat exchange means 4. The heat exchange means contact gases entering the collector via inlet 6 and exiting the collector via outlet 8 along the flow path indicated by arrows in FIG. 2 and effect heat exchange between such gases and an appropriate heat exchange fluid, such as air or water. The heat exchange means may constitute an air preheater (air heat exchange fluid), depicted in FIGS. 1-3, for use in the system of FIG. 6, or an economizer (water heat exchange fluid), depicted in FIGS. 4 and 5, for use in the system of FIG. 7.

The illustrated dust collector 2 includes an inclined top wall 10, four vertical side walls 12 and four inclined side walls 14, the latter forming hopper 16. The collector further provides a gravity separation chamber 18 in communication with the inlet and outlet. Gas flow through the collector and chamber 18 is indicated by arrows in FIG. 2. Exhaust gases including entrained dust enter the collector via inlet 6 in a horizontal direction and are directed in a forward direction (or from left to right as illustrated) along a generally horizontal course through inlet passage 22 in overlying relation with the chamber 18 and partially bounded by heat exchange means 4. Next, the gases are directed by flow reversal means 23 in a reverse downward direction into the chamber 18 while simultaneously therewith the gas velocity is reduced so that, upon entering chamber 18, the gas velocity is sufficiently low that entrained dust may be separated by gravity from the gases. The now cleaned gases pass upwardly to exit the collection chamber via gas recirculation means 24 which cause a portion of the cleaned gases to be directed through the heat exchange means 4 and then toward the outlet 8 via an outlet chamber 26 for discharge to atmosphere in a horizontal direction. The remaining portion of the cleaned gases are recirculated along with incoming gases from inlet 6 back to the chamber 18 for further dust separation.

The heat exchange means 4 are interposed between passage 22 and the outlet 8 for contact with both incoming and outgoing gases. The heat exchange means of FIGS. 1-3 include a plurality of open ended thermally conductive tubes 28 arranged in four superimposed horizontal rows, each tube extending the width of the housing in a direction perpendicular to the indicated direction of gas flow and spaced from adjacent tubes to allow gas flow therebetween. The tubes of the lowermost row extend in a common horizontal plane which defines the upper boundry of the passage 22. Gases entering the collector via the inlet 6 travel in a direction substantially parallel to the plane of the lowermost tube row which thus tend to direct gases along passage 22 and prevent passage of such gases toward the outlet. Gases exiting the collection chamber, however, approach the plane of the lowermost tube row in an upward inclined direction (see FIG. 2) so that the latter gases are able to pass between the tubes and travel toward the outlet. Due to the influence of incoming gases traveling along the inlet passage 22, however, only portion of the gases exiting the collection chamber are able to traverse the passage 22, pass between the heat exchange tubes, and reach the outlet 8, the remaining portion of such gases being carried along the passage 22 by incoming gases back to the collection chamber for further cleaning. Consequently, gases are recirculated through the collection chamber for highly effective cleaning.

For the air preheater of FIGS. 1-3, the heat exchange tubes 28 are joined at their ends with a cold air inlet manifold 30 and a hot air outlet manifold 32 (FIG. 3) which respectively are adapted to receive cold air from and return hot air to a boiler, as will be described presently. In the example of FIG. 3, tubes 28 provide unidirectional parallel path air flow in the direction indicated by arrows. The number, size and arrangment of the tubes are selected in accordance with the heat exchanger fluid used, in this case air, and with the temperature, flow rate, etc. of the exhaust gases. Additionally, the size and spacing between the tubes are selected to provide appropriate gas flow conditions for achievement of the gas recirculation mentioned above. The construction of the tubes 28, or of the manifolds, of course, may be varied, or countercurrent air flow substituted for the illustrated uni-directional air flow, or like modifications made to suit the requirements of individual installations.

Gas recirculation means 24 extend in a plane defining the lower boundry of the inlet passage 22 and include a plurality of elongated vane members 34, each L-shaped in cross section, interposed between the chamber 18 and the passage 22. The vane members are parallel and extend the width of the housing in a direction perpendicular to the indicated direction of gas flow. The vane members further are spaced apart at sufficient distance and are positioned to deflect gases exiting the chamber in an upward inclined direction to produce the abovementioned simultaneous gas discharge and recirculation. Additionally, the vane members are arranged in a common plane inclined slightly with respect to the plane of the lowermost row of heat exchange elements so that the passage 22 formed therebetween is of convergent configuration along the direction of gas flow. This configuration causes a portion of the gases, made up of incoming gases from inlet 6 and partially cleaned gases exiting the collection chamber via the recirculation means 24, to be forced upwardly through the heat exchange means as the gas stream travels along the progressively narrower portions of the inlet passage, thus supplementing the abovementioned gas discharge-recirculation process.

Figure 2:
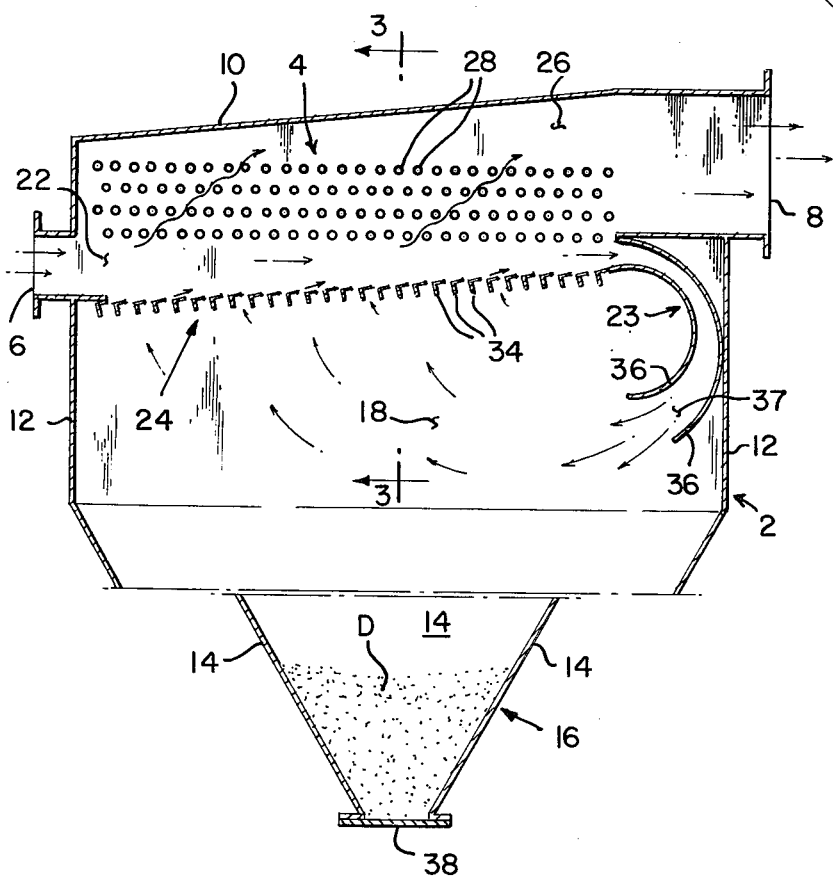
FIG. 2 is a longitudinal vertical section of the FIG. 1 apparatus, depicting gas flow therethrough.
Figure 3:
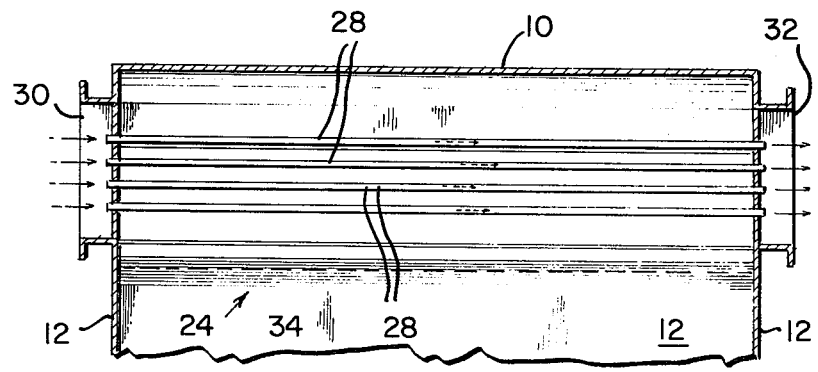
FIG. 3 is a section taken along the lines 3—3 in FIG. 2.

Flow reversal means 23 communicate with the forward reduced cross section terminus of the inlet passage 22 for reversing the direction of travel of incoming and recirculating gases and directing them in a downwardly inclined direction into the chamber 18, as indicated by arrows in FIG. 2. The flow reversal means include two divergent curved plates 36 which again extend the width of the housing and which form therebetween a curved passageway 37 of progressively increasing cross sectional area in the indicated direction of gas flow. Consequently, the gas velocity is reduced as the gases travel through the curved passageway 37.

A further reduction in gas velocity is effected as the gases are directed into and expand within chamber 18. Chamber 18 is of sufficient volume that incoming gases are expanded to produce a gas velocity therein low enough to enable entrained dust D to be separated from the gases by gravity. As the dust D settles out by gravity, it is collected in the hoppered bottom 16, as depicted in FIG. 2, from which it is discharged through an outlet 38 at the lowermost point of the hoppered bottom. The now clean gases then rise upwardly through the gas recirculation means for discharge via the outlet or recirculation for further cleaning, as described previously. It will be recognized that the low gas velocity within chamber 18 also allows the gases to exchange heat with and hence reduce the temperature of the walls 12 and 14, thus prolonging the life of the apparatus.

Figure 6:
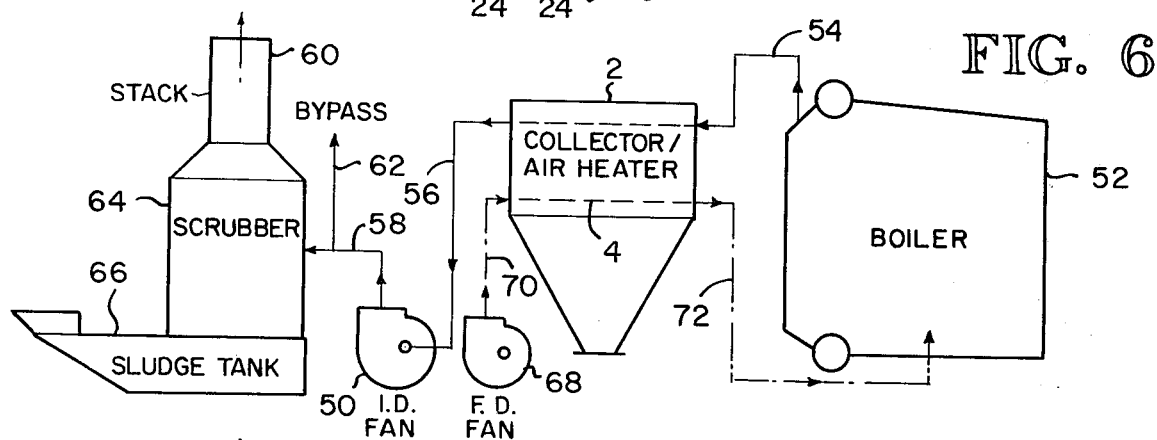
FIG. 6 is a schematic depicting a boiler installation including the FIG. 1 apparatus.

FIG. 6 depicts the combination dust collector and air preheater of FIGS. 1-3 in a typical boiler installation. Boiler exhaust or flue gas flow is represented by solid lines, whereas air flow is represented by broken lines in FIG. 6. Referring to the illustrated exhaust gas flow path, induced draft fan 50 draws exhaust gases from the boiler 52 (or like source of exhaust gas) via inlet line 54, through the dust collector/air preheater 2 and then to the fan itself via line 56. The fan then feeds gases via line 58 to the stack 60 for discharge to atmosphere. The fan 50, of course, may be eliminated if the system possesses sufficient natural draft.

The dust collector/air preheater removes enough entrained dust that the gases present in line 58 are cleaned sufficiently for discharge directly via the stack 60, or via a bypass line 62, depending upon the application; however, for additional dust removal and move effective cleaning of the gases, a wet scrubber 64 may be interposed between line 58, and the stack 60. A sludge tank 66 collects dust removed by the scrubber. One scrubber suitable for use in the system of FIG. 6 is illustrated and described in U.S. Pat. No. 3,918,904, issued to Westlake.

Referring to the illustrated air flow path of FIG. 6, a forced draft fan 68 feeds cold air via line 70 to the cold air inlet, through the heat exchanger 4 and thence via line 72 to the boiler 52. The heated air thus fed to the boiler produces an increase in boiler thermal efficiency. The system of FIG. 6 is particularly suited for negative furnace pressure boiler installations.

Figure 4:
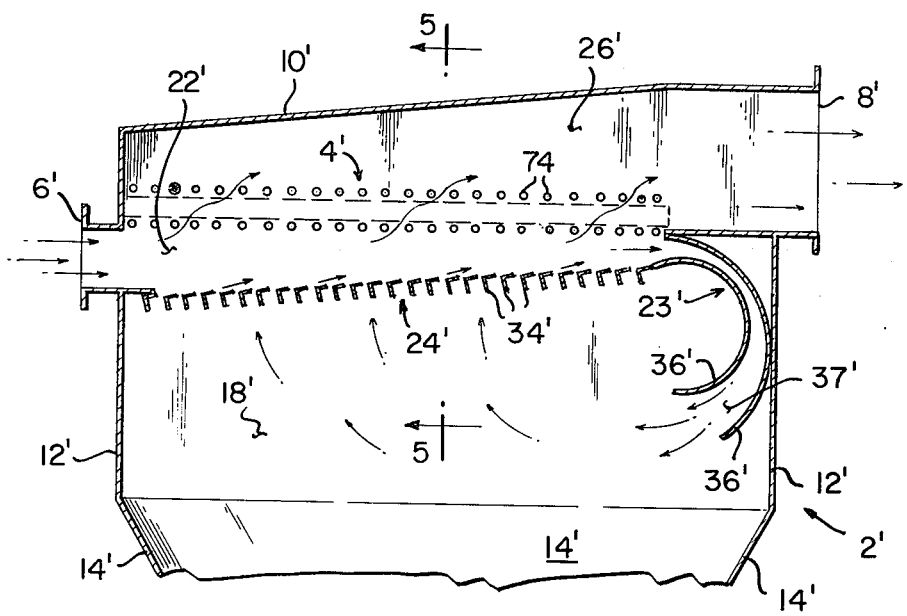
FIG. 4 is a longitudinal vertical section generally similar to FIG. 2 of the combination dust collector and heat exchanger of this invention adapted for use as an economizer.
Figure 5:
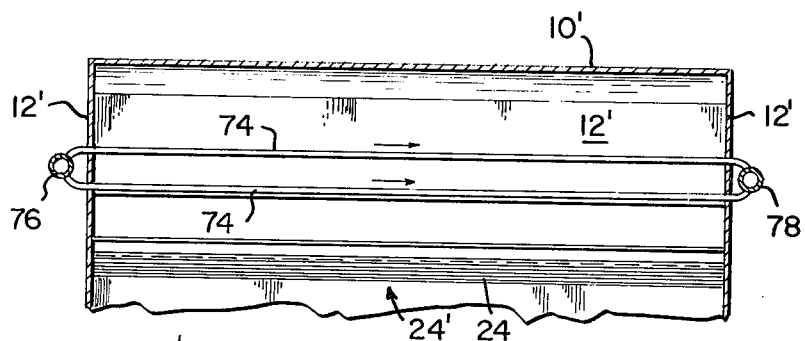
FIG. 5 is a section taken along lines 5—5 in FIG. 4.

Referring now in particular to FIGS. 4 and 5, the combination dust collector and heat exchanger of this invention as adapted for usage as an economizer is generally similar to the apparatus illustrated in FIGS. 1-3, except that a water heat exchanger is substituted for the air heat exchanger. In FIGS. 4 and 5, therefore, like parts corresponding to those illustrated and described with reference to FIGS. 1-3, are designated with primed reference numerals and are not further described herein.

The water heat exchanger of FIGS. 4 and 5 includes two vertically spaced apart horizontal rows of water tubes 74 which extend the width of the collector and which are connected at their ends with an inlet header 76 and an outlet leader 78, respectively, for uni-directional transfer of water therebetween, as depicted by arrows in FIG. 5. The inlet and outlet headers are respectively connected for receiving cold water from and supplying hot water to the boiler as will be described presently. Again, as was the case with the air heat exchanger of FIGS. 1-3, the number, size and arrangement of the water tubes are selected to suit the requirements of individual installations and the illustrated tube and header construction may be modified, such as by utilizing countercurrent water flow, as desired.

Figure 7:
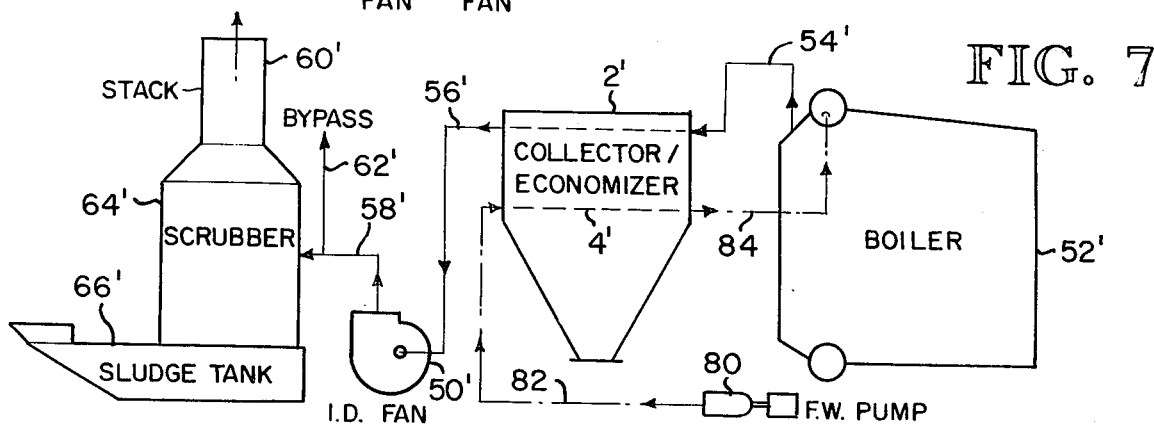
FIG. 7 is a schematic depicting a boiler installation including the FIG. 4 apparatus.

FIG. 7 depicts the dust collector/economizer of FIGS. 4 and 5 in a typical boiler installation. The FIG. 7 system corresponds to the FIG. 6 system (like parts again being designated with primed reference numerals), except that a feed water pump 80 feeds cold water via line 82 to the cold water side of heat exchanger 4' through the heat exchanger 4' and then to the boiler via line 84. The FIG. 7 system is particularly suited for negative or positive furnace pressure boiler installations.

While the preferred embodiments of the invention have been illustrated and described herein, it should be understood that variations will become apparent to one of ordinary skill in the art. Accordingly, the invention is not to be limited to the specific embodiments illustrated and described herein and the true scope and spirit of the invention are to be determined by reference to the appended claims.

The embodiments of the invention in which an exclusive property or privelege is claimed are defined as follows:

1. A combination dust collector and heat exchanger, comprising: means for providing a gravity separation chamber having an inlet and an outlet; means in communication with the inlet for recirculating gases through the chamber at reduced gas velocity so that particulate material entrained by the gases may be separated therefrom by gravity during passage of the gases through the chamber, and for discharging a portion of the gases through the outlet; and heat exchange means operatively associated with the chamber for exchanging heat between the gases and a fluid prior to discharge of the gases through the outlet; said means for recirculating gases including means for directing gases from the inlet along a generally horizontal course in overlying relation to the chamber and communicating with the outlet, means being interposed between the chamber and said horizontal course for causing a portion of the gases exiting the chamber to be discharged via the outlet, and for causing the remaining portion of said gases to be returned to the chamber along said horizontal course, and means in communication with said horizontal course for first reversing the direction of gas flow from the inlet, and then for directing the gases into the chamber at reduced gas velocity; said heat exchange means being located between the outlet and said horizontal course and including a plurality of heat exchange elements spaced apart a sufficient distance to permit gas flow therebetween toward the outlet, said heat exchange elements and said means interposed between the chamber and said horizontal course extending in convergent planes along the direction of gas flow from the inlet to form a convergent inlet passage constituting said horizontal course.

2. A combination dust collector and heat exchanger, comprising: means for providing a gravity separation chamber having an inlet and an outlet; means including a plurality of tubular heat exchange elements for recirculating gases through the chamber along a generally horizontal course in overlying relation to the chamber and then into the chamber at reduced gas velocity so that particulate material entrained by the gases may be separated therefrom by gravity during passage of the gases through the chamber, and for discharging a portion of the gases through the outlet; and means for passing a heat exchange fluid through said heat exchange elements, whereby particulate material is collected in the chamber while simultaneously therewith the heat exchange elements are contacted by the gases to produce heat exchange between the heat exchange fluid and the gases; the outlet communicating with said horizontal course, and said heat exchange elements being located between said outlet and said horizontal course, said heat exchange elements extending in a plane substantially parallel to the direction of gas flow along said horizontal course and being spaced apart at sufficient distance to permit gas flow therebetween toward the outlet.

3. The combination dust collector and heat exchanger of claim 2, wherein said means for recirculating gases include gas recirculation means interposed between said horizontal course and the chamber for causing a portion of the gases exiting the chamber to be discharged via the outlet, and for causing the remaining portion of such gases to be returned to the chamber along said horizontal course.

4. A combination dust collector and heat exchanger, comprising: means for providing a gravity separation chamber having an inlet and an outlet; means in communication with the inlet for directing gases therefrom along a generally horizontal course communicating with the outlet in overlying relation to the chamber, then reversing the direction of gas flow from the inlet, and thereupon directing gases into the chamber while simultaneously therewith producing a reduction in gas velocity so that particulate material entrained by the gases may be separated therefrom by gravity during passage of the gases through the chamber toward outlet; and heat exchange means located between the outlet and said horizontal course and including a plurality of tubular heat exchange elements spaced apart at sufficient distance to permit gas flow therebetween toward the outlet; said means for directing gases including gas recirculation means interposed between the chamber and said horizontal course for causing a portion of the gases exiting the chamber to be discharged via the outlet, and for causing the remaining portion of such gases to be returned to the chamber along said horizontal course; said heat exchange elements and said gas recirculation means extending in convergent planes along the direction of gas flow from the inlet to form a convergent inlet passage constituting said horizontal course.

* * * * *